United States Patent [19]
Jelenic et al.

[11] Patent Number: 5,464,907
[45] Date of Patent: Nov. 7, 1995

[54] PROCESS FOR THE MODIFICATION OF α-OLEFIN (CO) POLYMERS

[75] Inventors: Jernej Jelenic, Schalkhaar; John Meijer, Deventer; Peter Hope, Twello, all of Netherlands

[73] Assignee: Akzo Nobel N.V., Netherlands

[21] Appl. No.: 387,913

[22] PCT Filed: Jul. 28, 1993

[86] PCT No.: PCT/EP93/02008

§ 371 Date: Feb. 21, 1995

§ 102(e) Date: Feb. 21, 1995

[87] PCT Pub. No.: WO94/05707

PCT Pub. Date: Mar. 17, 1994

[30] Foreign Application Priority Data

Aug. 27, 1992 [EP] European Pat. Off. .............. 92202608

[51] Int. Cl.$^6$ ........................................................ C08F 8/00
[52] U.S. Cl. ........................ 525/303; 525/333.8; 525/386; 525/387
[58] Field of Search ................................ 525/303, 333.8, 525/386

[56] References Cited

U.S. PATENT DOCUMENTS 2,525,787  10/1950  Fontana et al. .................... 260/683.15

FOREIGN PATENT DOCUMENTS

| | | |
|---|---|---|
| 999698 | 11/1976 | Canada . |
| 0190889B1 | 8/1986 | European Pat. Off. . |
| 0208353 | 1/1987 | European Pat. Off. . |
| 0273990 | 7/1988 | European Pat. Off. . |
| 0322945 | 7/1989 | European Pat. Off. . |
| 0384431 | 8/1990 | European Pat. Off. . |
| 6808574 | 12/1968 | Netherlands . |
| 1212017 | 11/1970 | United Kingdom . |
| 91/00300 | 1/1991 | WIPO . |
| 91/00301 | 1/1991 | WIPO . |

OTHER PUBLICATIONS

"Catalyzed Polymerization of Monoalkylethylenes: Promoted Aluminum Bromide Catalyst", Fontana, et al., *Industrial and Engineering Chemistry*, vol. 44, No. 7 pp. 1688–1695 (Jul. 1952).
"Degradation of Polyolefins during Melt Processing", Hisken, et al., *Polymer Degradation and Stability* 34 pp. 279–293 (1991).
"On–Line Viscoelastic Measurements For Polymer Melt Processes", Zeichner and Macosko, Proceeding of the SPE 40th ANTEC Meeting, San Francisco, pp. 79–81 (May 1982).
"Crosslinking Agents in Ethylene–Propylene Rubbers", Hofmann, *Progress in Rubber and Plastics Technology*, vol. 1, No. 2, pp. 18–50 (Mar. 1985).
"*Rubber Chemistry and Technology*", vol. 61, pp. 242–254.
"Melt Flow Index Values and Molecular Weight Distributions of Commercial Thermoplastics", Bremner et al., *Journal of Applied Polymer Science*, vol. 41, pp. 1617–1627 (1990).
International Search Report prepared by the European Patent Office dated Sep. 22, 1993.
"Effect of the Type of Radical Initiator on Crosslinking of Polypropylene", Chodak, et al., *Die Angewandte Makromolekulare Chemie 106*, pp. 153–161 (1982).

Primary Examiner—Bernard Lipman
Attorney, Agent, or Firm—Ralph J. Mancini; Louis A. Morris

[57] ABSTRACT

A process for the modification of α-olefin (co)polymers to introduce branching, is disclosed. More particularly, the present invention relates to a process of branching α-olefins by contacting said α-olefins with a peroxide compound containing an activated unsaturated group at a temperature above 120° C. The process may be carried out under a nitrogen atmosphere or in the melt form under an oxygen-containing atmosphere.

8 Claims, No Drawings

PROCESS FOR THE MODIFICATION OF α-OLEFIN (CO) POLYMERS

The present invention relates to a process for the modification of αolefins to introduce branching therein. More particularly, the present invention relates to a process of branching α-olefins by contacting said α-olefins with a peroxide compound containing an activated unsaturated group at a temperature above 120° C.

Typical commercially available polypropylene is a normally solid, predominantly isotactic, thermoplastic polymer mixture formed by the polymerization of propylene monomers in the presence of a Ziegler-Natta catalyst. This type of polypropylene generally has a linear structure. Although commercial polypropyl has many beneficial properties, it is unsatisfactory in melt strength and strain hardening. Therefore, it exhibits a number of shortcomings when melt-processed. As a result, its use has been limited in applications such as extrusion coating, blow moulding, profile extrusi on and thermoforming.

Low molecular weight, amorphous (predominantly atactic) polypropylene with a branched molecular structure is known from Fontana, et al., *Ind. & Eng. Chem.*, 44(7), 1688–1695 (1952) and U.S. Pat. No. 2,525,787. However, the average molecular weight of this material is generally below 20,000 making it unacceptable for many applications.

Numerous patent publications disclose the treatment of linear polypropylene with ionizing radiation to either degrade or cross-link the linear polymer chains. A typical example of such a patent publication is European patent application 0 190 889 which describes a high molecular weight, long chain, branched polypropylene made by irradiating linear polypropylene with high-energy ionizing radiation. The free-end branched polymer is gel-free and has strain-hardening elongational viscosity.

Further there are a number of publications describing the treatment of polypropylene with peroxides. Such references generally refer to a degradation or cross-linking of the polypropylene and degradation normally predominates. Generally, such peroxide treatments lead to a polypropylene with a narrow molecular weight distribution and having both lower number average and weight average molecular weights. A typical example of such publications is, "Degradation of Polyolefins during Melt Processing," Hinsken et al., *Polymer Degradation and Stability*, 34, pp. 279–293 (1991).

Canadian patent 999,698 discloses the degradation of polypropylene in a nitrogen atmosphere at 150°–220° C. by using organic peroxides such as t-butyl peroxymaleic acid and 2,5-bis (t-butylperoxy)-2,5-dimethyl hexane, among others. This modification process leads to a controlled reduction of at least 50% in the viscosity (an increase in the melt flow index (MFI)) of the polypropylene.

Chodák. I. and Lazár, M.; "Effect of the Type of Radical Initiator on Crosslinking of Polypropylene," suggests that there are some possibilities to achieve a certain amount of crosslinked polypropylene by, for example, using a high content of peroxide initiator or a high irradiation dose. However, these data are characterized as sporadic and no conclusion can be drawn about the effect of reaction conditions and type of initiator on the efficiency of crosslinking.

Netherlands patent application 6,808,574 discloses the modification of rubbers, including ethylene/propylene rubbers, by contacting the rubbers with a peroxide such as-t-butylperoxy crotonate or di-t-butyl-di-peroxy fumarate at a temperature of 140°–160° C. in order to crosslink the rubber composition.

In addition, the following patent publications disclose the modification of polypropylene with unsaturated peroxides: World patent applications WO 91/00301, WO 91/00300, European patent applications 0 208 353, 0 273 990, and 0 322 945. In each case, the polypropylene is degraded resulting in a lower final weight average molecular weight, although, with the addition of unsaturated co-crosslinking agents, a cross-linked polypropylene with a higher molecular weight can be obtained.

Finally, European patent application 0 384 431 discloses a process for the branching of polypropylene by contacting the polypropylene with a peroxide having a low decomposition temperature at a temperature of less than 120° C. in a mixing vessel in the substantial absence of oxygen, decomposing the peroxide and subsequently deactivating all free radicals present in the composition. This process is said to result in significant branching of linear polypropylene thereby improving its melt processing characteristics. Suitable low decomposition temperature peroxides are, for example, the peroxydicarbonates. This publication also states that if a temperature above 120° C. is employed, a product with little or no branching will be obtained.

However, the process of European patent application 0 384 431 suffers from the disadvantage that it is limited in application to solid polypropylene at a temerperature below 120° C. Accordingly, this process cannot be performed in the melt-processing step and thereby an extra step in the polypropylene manufacture will be required.

Accordingly, it is the primary object of the present invention to provide a process for the modification of α-olefins which overcomes the aforementioned disadvantages of the prior art processes. These and other objects of the invention will be explained in greater detail in the description of the invention which follows.

The present invention relates to a process for the modification of a linear or branched $C_3$–$C_{10}$ (co)polymer which may contain up to 5% by weight of ethylene, characterized in that the (co)polymer is contacted at a temperature of at least 120° C., with an effective amount of at least one peroxide represented by any one of the formulas I–IV to modify the (co)polymer and that the weight average molecular weight of the (co)polymer after modification is at least 70% of the weight average molecular weight of the (co)polymer prior to modification:

$$R \!\!-\!\!\left[\!-\!O\!-\!O\!-\!\overset{O}{\underset{\|}{C}}\!-\!\overset{R_1}{\underset{|}{C}}\!=\!\overset{R_2}{\underset{|}{C}}\!-\!\overset{O}{\underset{\|}{C}}\!-\!O\!-\!R^3\!\right]_n \quad (I)$$

wherein n= 1, 2 or 3; $R^1$ and $R^2$ are independently selected from hydrogen, $C_{1-10}$ alkyl groups, $C_{6-12}$ aryl groups, $C_{7-22}$ aralkyl groups and $C_{7-22}$ alkaryl groups, which groups may be substituted with one or more functional groups selected from hydroxy, halogen, ester, acid, amido, alkoxy, aryloxy, ketone and nitrile groups; $R^3$ is selected from $C_{1-10}$ alkyl groups, $C_{6-12}$ aryl groups, $C_{7-22}$ aralkyl groups, $C_{7-22}$ alkaryl groups and $C_{2-10}$ 1-alkene groups, which groups may be substituted with one or more functional groups selected from hydroxy, halogen, ester, acid, amido, alkoxy, aryloxy, ketone and nitrile groups, and $R^1$ and $R_2$, $R^1$ and $R^3$ or $R_2$ and $R^3$ may combine to form a ring, and when n= 1; R is selected from a tertiary-alkyl group, a tertiary cycloalkyl group, a tertiary alkylcycloalkyl group, a tertiary alkynyl group containing 4–18 carbon atoms and a group of the general formula:

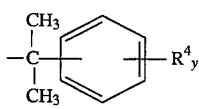

wherein y= 0, 1 or 2 and $R^4$ represents an isopropyl group, an isopropenyl group or a 2-hydroxyisopropyl group;

when n= 2; R is selected from an alkylene group with 8–12 carbon atoms which at both ends has a tertiary structure, an alkynylene group with 8–12 carbon atoms which at both ends has a tertiary structure, a group of the general formula:

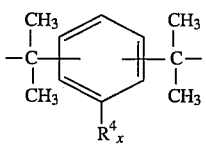

wherein x= 0 or 1 and $R^4$ has the above-indicated meaning; and when n= 3; R= 1,2,4-triisopropylbenzene-$\alpha,\alpha',\alpha''$-triyl or 1,3,5-triisopropyl benzene-$\alpha,\alpha',\alpha''$-triyl;

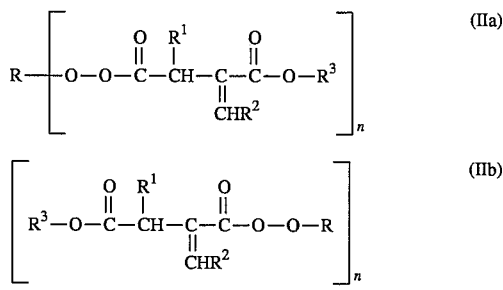

wherein n, R, $R^1$, $R^2$ and $R^3$ are as defined above;

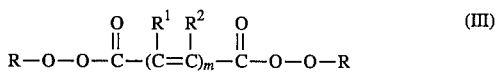

wherein m=1–2 and R, $R^1$ and $R^2$ are as defined above; and

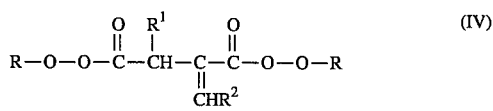

wherein R, $R^1$ and $R^2$ are as defined above.

The alkyl groups, alkenyl groups and alkylene groups may be linear or branched unless otherwise indicated. In view of steric requirements it should be noted that when there is an aromatic ring in the molecule (see above with n=1 and n=2), the ring substituents must, in the case of disubstitution, not be in a position ortho relative to each other and, in the case of trisubstitution, not be in three adjacent positions.

In addition the present invention also relates to the use of the peroxides of the formulas I–IV to modify $C_3$–$C_{10}$ α-olefin (co)polymers.

As used herein, α-olefin (co)polymer means an α-olefin polymer material selected from homopolymers of α-olefins, random copolymers of α-olefins and up to 5% by weight, based on the weight of the total polymer composition, of ethylene, and random terpolymers of two different α-olefins and up to 5% by weight, based on the weight of the total polymer composition, of ethylene.

Also embodied within the definition of α-olefin (co)polymer are α-olefins containing the usual additives such as fillers, pigments, stabilizers, etc. Particularly preferred modification processes are carried out on talc-filled and calcium carbonate-filled α-olefins to further enhance the advantageous properties of these materials.

In addition, the unmodified α-olefin (co)polymer to be treated in accordance with the process of the present invention preferably has a weight average molecular weight of at least 100,000.

Branching in the context of the present invention, is represented by an increase in the polydispersity index (PDI) for the modified (co)polymer as compared to the PDI for the unmodified (co)polymer while retaining at least 70% of the weight average molecular weight of the unmodified (co)polymer after modification. The measurement of PDI has been described in, Zeichner, G. R. and Macosco, C. W., *Proceedings of the SPE* 40th ANTEC Meeting, San Francisco, p.79 (May 1982).

The treatment of the α-olefin by the process of the present invention generally produces a substantially branched polymeric material having a net increase in weight average molecular weight with respect to the starting polymer. However, since peroxide radicals can cause chain scissions, notwithstanding the recombination of chain fragments to form branches, there can be a net reduction in the weight average molecular weight from the starting polymer to the modified polymer. The weight average molecular weight should be at least 70% of the weight average molecular weight of the unmodified polymeric material. More preferably, at least 100% of the weight average molecular weight of the unmodified polymeric material is retained in the modified (co)polymer, and, most preferably, an increase of at least 20% in the weight average molecular weight is acheived.

The α-olefin (co)polymer material treated by the process of the present invention may be in any physical form including finely divided particles (flake), pellets, film, sheet, and the like. In the preferred embodiments of the present invention the (co)polymeric material is in the finely divided form suitable for powder modification in a substantially oxygen-free atmosphere, or in the melt form suitable for modification in an air-containing atmosphere or a nitrogen atmosphere.

The amount of peroxide used in the process of the present invention should be an amount effective to achieve branching of the α-olefin as is hereinabove defined. More particularly, in the process carried out under a substantially oxygen-free atmosphere, from 0.1 to 10 mmol of peroxide, per 100 grams of (co)polymer, should be employed. More preferably, from 0.5 to 5.0 mmol of peroxide, per 100 grams of (co)polymer is used.

For the melt process carried out in the presence of oxygen, a larger amount of peroxide is generally needed to branch the α-olefin. More particularly, from 0.1 to 50 mmol peroxide, per 100 grams of (co)polymer, should be employed and more preferably from 1 to 25 mmol of peroxide, per 100 grams of (co)polymer is used.

The peroxides useful in the present invention are those represented by the formulas I–IV above. These peroxides are generally characterized as having an activated unsaturation within the peroxide molecule, which activating group is not a carboxylic acid group. We have surprisingly found that with this type of peroxide compound a significant amount of branching in the (co)polymer can be achieved.

A particularly preferred peroxide in accordance with the present invention is t-butyl peroxy n-butyl fumarate.

In the process of the present invention, one or more peroxides of the formulas I-IV are brought into contact with the α-olefin and the mixture is heated to a temperature of 120°–240° C. for a time sufficient to decompose substantially all of the peroxide. A more preferred temperature range is from 130°–200° C. Of course, the preferred modification temperature will depend upon the particular peroxide to be employed in the process, as well as whether the process requires the melting of the (co)polymer or not.

The reaction time used in the present process is preferably about 10–30 half lives of the peroxide at the reaction temperature. More preferably, a reaction time of 15–25 peroxide half lives is employed. The reaction time, at 140° C., will generally range from 0.1 minutes to 180 minutes and more preferably from 10 minutes to 120 minutes. At 180° C. the reaction time is generally from 0.1 to 15 minutes.

The present modification process can be carried out in one of two ways, under a nitrogen atmosphere or in the melt form under an air or nitrogen atmosphere. The process under a nitrogen atmosphere is preferred since more branching is achieved in that manner.

For the process under nitrogen, the α-olefin should be pretreated by introducing it to a bed blown with nitrogen. The α-olefin should remain at least five minutes in the nitrogen atmosphere in order to effectively remove substantially all of the active oxygen from the material. Once the α-olefin is prepared, it should be maintained in an environment with a low active oxygen content until the modification reaction is complete. Prior to addition of the modifying peroxide, the active oxygen content in the reaction zone should be as low as possible and preferably below about 0.004%, by volume.

The application of heat for the branching process under nitrogen can be by any conventional means or can be a fluidized bed wherein the fluid medium is nitrogen or other inert gas. The temperature is raised to from 120°–240° C. Of course, processes wherein treatment at two or more temperature levels is used, are also within the scope of the present invention.

The melt modification process is carried out in the conventional manner for modifying polymers in the melt. Such a process is described in World patent application WO 91/00301, the disclosure of which is hereby incorporated by reference.

In another embodiment of the present invention, the modification process in either a nitrogen or air atmosphere, is carried out in the presence of a coagent in order to reduce or prevent the negative effects of (co)polymer degradation or enhance the degree of modification of the (co)polymer.

A coagent is generally understood to be a polyfunctional reactive additive such as a polyunsaturated compound which will react rapidly with polymer radicals, will overcome steric hindrance effects and minimize undesirable side reactions. Further information about coagents is set forth in Rubber Chemistry and Technology, Vol. 61, pp. 238–254 and W. Holmann, Progress in Rubber and Plastics Technology, Vol. 1, No. 2, March 1985, pp. 18– 50, the disclosures of which are hereby incorporated by reference. In relation to the present invention, the term "coagent" has the same meaning as given in these publications.

A wide variety of useful coagents are commercially available including di- and triallyl compounds, di- and tri(meth)acrylate compounds, bismaleimide compounds, divinyl benzene, vinyl toluene, vinyl pyridine, parachinone dioxime, 1,2-cis-polybutadiene and their derivatives. Furthermore, other useful coagents include oligomers of 1,3-diisopropenyl benzene, 1,4-diisopropenyl benzene and 1,3, 5-triisopropenyl benzene.

The incorporation of an effective amount of one or more of these coagents into the (co)polymer, prior to or during the reaction with the present peroxides, will tend to reduce or prevent the degradation of the modified materials and thereby maintain the mechanical properties at at least the same level. Surprisingly, in some cases the coagent may result in improved mechanical properties such as an enhanced adhesion strength in modified (co)polymers of a polar nature. These enhancements may be attributable to a greater degree of functional group introduction into the (co)polymer resulting from the presence of the coagent. The amount of coagent employed is preferably from 0.1 to 20 mmol per 100 grams of (co)polymer and more preferably from i to 10 mmol per 100 grams of (co)polymer.

The following examples are provided for the purpose of illustration and description only and are not intended to limit the scope of the invention in any way. The scope of the invention is to be determined from the claims appended hereto.

The following abbreviations are employed in the examples.

| | |
|---|---|
| TBPNBF = | tertiary-butylperoxy-n-butylfumarate |
| Tx-SBP C50 = | di-sec-butylperoxy dicarbonate (ex. Akzo Chemicals) |
| Tx-36 C80 = | bis-(3,5,5-trimethylhexanoyl) peroxide (ex. Akzo Chem.) |
| Tx 101 = | 2,5-bis(t-butylperoxy)-2,5-dimethylhexane(ex. Akzo Chem.) |
| Tx-EHP C75 = | bis(2-ethylhexyl)peroxy dicarbonate (ex. Akzo Chemicals) |
| PDI = | Polydispersity Index |
| MFR = | Melt Flow Rate |
| ETA(0) = | Low Shear Melt Viscosity |
| PP = | Hostalen PPU 0180P (ex. Hoechst) |
| Pk 401 = | ethyleneglycol dimethacrylate (ex. Akzo Chemicals) |
| TBPEtIt = | tertiary-butylperoxy-ethylitaconate |

MFR was measured using a Gottfert Melt Flow Indexer at 230° C. and 2.16 kg.

ETA(O), dynamic storage modulus G' and the dynamic loss modulus G" were measured using a Rheometrics Dynamic Analyzer RDA-700, at 200° C. using parallel plate geometry.

Lambda=the number of long chain branches per 1000 repeating units of the polymer.

PDI is the inverse of the crossover modulus according to the method of Zeichner mentioned above.

Die Swell= $[(D/D_o)-1]=$ ratio of the diameter of the extrudate (D) to that of the die ($D_o$).

Example 1 and Comparative Examples A-B 100 grams of PP and 3.5 mmol of peroxide modifier were mixed in a flask which was then attached to a Rota-Vapor flushed with nitrogen. The flask was rotated for 20 minutes to fill it with nitrogen. After that, it was rotated in an oil bath at 140° C. for 21–112 minutes (i.e. 15 times the half-life of the peroxide). The results are given in Table 1.

TABLE 1

Modification of PP powder (Hostalen PPU 0180P) at 140° C. for 21–112 min. with 3.5 mmol peroxide/100 g PP, nitrogen atmosphere.

|  | Peroxide | PDI | ETA(0) Pa*sec |
|---|---|---|---|
| Control | none | 65.7 | 3400 |
| 1 | TBPNBF | 1030.2 | 29000 |
| Comparative Examples | | | |
| A | Tx-SBP C50 | 82.5 | 3200 |
| B | Tx-36 C80 | 50.0 | 390 |

EXAMPLE 2

The process of Example 1 was repeated except that different amounts of peroxide modifier were employed. The results are given in Table 2.

TABLE 2

Modification of polypropylene powder (Hostalen PPU 0180P) with different concentrations of peroxide/100 g PP, at 140° C., 21–112 min., nitrogen atmosphere.

|  | Peroxide TBPNBF (mmol/100 g PP) | MFR (g/10 min.) | Die Swell[(D/D$_o$) – 1] (extrudate from MFR) (%) |
|---|---|---|---|
| Control | none | 21.2 | –14 |
|  | 1 | 22.0 | 0 |
|  | 2 | 17.9 | 81 |
|  | 3.5 | 9.1 | 114 |
|  | 7 | 4.1 | 67 |

The MFR is related to molecular weight as is taught in, "Melt Flow Index Values and Molecular Weight Distributions of Commercial Thermoplastics," Bremner, A. and Rudin, A., *Journ. App. Polym. Sci.*, Vol. 41, pp. 1617–1627 (1990).

Die swell is an elastic recovery of the extrudate emerging from a capillary with circular cross-section. The diameter of extrudate (D) becomes, as a rule, larger than that of the capillary (D$_o$). A quantitative characteristic of this effect is the ratio [(D/D$_o$)– 1 ] called the die swelling ratio or the elastic recovery ratio.

Change of the size of the extrudate after leaving the capillary is an effect caused by molecular parameters which effect the elasticity of polymer melt and which are described in the literature:

"Rheology of Polymers", G. V. Vinogradov and A. Ya. Malkin, Springer-Verlag, 1980, p. 374.

"Viscoelastic Properties of Polymers", J. D. Ferry, Ed. John Wiley, 3rd edition, 1980, p. 385.

In branched polymers when the branches are long enough to entangle, the Eta(O) and the steady-state compliance (a measure of the elastic deformation during steady flow) are enhanced.

EXAMPLE 3

Example 2 was repeated except that Moplen FL S20(ex.Himont) was substituted for the Hostalen PPU 0180P. The results obtained are as follows.

TABLE 3

| | Peroxide TBPNBF (mmol/100 g PP) | MFR (g/10 min.) | Die Swell [(D/D$_o$) – 1] (%) |
|---|---|---|---|
| Control | none | 4.7 | –5 |
|  | 1 | 8.6 | 71 |
|  | 2 | 6.0 | 105 |
|  | 3.5 | 5.0 | 129 |
|  | 7 | 1.9 | 10 |

Example 4 and Comparative Examples C-D

TABLE 4

Modification of polypropylene in the melt in a Haake Rheomix at 180° C., 15 min., air atmosphere with 20 mmol peroxide/100 g PP.

|  | Peroxide | PDI | ETA Pa*sec |
|---|---|---|---|
| Control | none | 48.6 | 1950 |
| 3 | TBPNBF | 1213.2 | 40000 |
| Comparative Examples | | | |
| C | Tx-EHP C75 | 71.4 | 420 |
| D | Tx-36 C80 | 55.6 | 830 |

EXAMPLE 5

In this example, 1 phr of the peroxide was added during the melt processing of talcum-filed polpropylene. The results are presented in Table 5.

TABLE 5

Effect of addition of 1 phr of Tx 43 and TBPNBF on processing and final mechanical properties of 40% talcum-filled polypropylene.

|  | TBPNBF % Improvement |
|---|---|
| Melt Flow Rate(*), Increase | 840 |
| Impact Unnotched | 7.6 |
| Flexural Strength | 6.2 |
| Flex. E Modulus | 2.6 |
| Tensile Strength | 12.3 |
| Tens. E Modulus | 8.4 |

(*)230° C., 2.16 kg

Example 6

Modification of polypropylene powder with different amounts of TBPEtIt* (T-butylperoxy-ethylitaconate)/100 g PP, at 140° C., 112 min., nitrogen atmosphere.

Example 2 was repeated with a differnt peroxide. The results are given in Table 6.

Polypropylene Holstalen 0180P (ex. Hoechst

*) see formula IIa

TABLE 6

|  | Peroxide TBPEtIt (mmol/100 g PP) | MFR (g/10 min.) | Die swell [(D/D$_o$) – 1] (%) |
|---|---|---|---|
| Control | none | 21 ± 3 | –14 |
| 6a | 3.5 | 31 ± 6 | 57 |
| 6b | 7 | 19 ± 3 | 95 |

5,464,907

EXAMPLE 7a

Modification of polypropylene powder with different concentrations of peroxide/100 g pp at 140° C. 112 min., nitrogen atmosphere. The procedure of Example 1 was employed for Examples 7a–7b.

PP homopolymer,. $Mw^2=250$ kg/mol.

TABLE 7a

| | Peroxide TBPNBF[1] (mmol/100 g PP) | Die swell [(D/D$_o$) − 1] (%) | Mw[2] (kg/mol) | Lambda (avg.)[3] ($10^{-3}$) |
|---|---|---|---|---|
| Control | 0 | −14 | 240 | 2 |
| 7a.1 | 0.5 | 10 | 220 | 5 |
| 7a.2 | 1 | 14 | 250 | 14 |
| 7a.3 | 2 | 67 | 270 | 87 |

EXAMPLE 7b

Modification of polypropylene powder with peroxide/100 g PP, at 140° C., 112 min., nitrogen atmosphere in the presence of antioxidant (Irganox 1010 ex. Ciba Geigy) added up to the PP prior to the peroxide.

PP homopolymer, $Mw^2)=360$ kg/mol

TABLE 7b

| | Peroxide TBPNBF[1] (mmol/100 g PP) | Irganox ® 1010 (wt %) | Die swell [(D/D$_o$) − 1] (%) | Mw[2] (kg/mol) |
|---|---|---|---|---|
| Control | 0 | 0 | −5 | 380 |
| 7b.1 | 0 | 0.1 | 0 | — |
| 7b.2 | 1 | 0 | 48 | 340 |
| 7b.3 | 1 | 0.1 | 43 | — |

The same die swell has been obtained after treatment of polypropylene with TBPNBF with or without a stabilizer present.
[1]TBPNBF used as 50% solution is isododecane.
[2]Estimated with size exclusion chromatography, Water 150 C., solvent 1,2,4 trichlorobenzene, flow 1 ml/min, 140° C. via universal calibration with polystyrene.
[3]Average number of long chain branches per 1000 repeating units (monomers) estimated from SEC/viscometry system, Viscotek 100, Viscotek Corp. and based on Zimm - Stockmayer relations for randomly branched monodisperse polymers with trifunctional branch points with the structure factor $\epsilon = 0.75$.

See for detailed information:

B. H. Zimm, W. H. Stockmayer, J. Chem. Phys. 17, 1301, (1949), and

H. Kramer-Lucas, J. Rathum, "The application of the size exclusion chromatography/viscometry technique to the determination of molar-mass and long-chain branching in polychloroprene", Makrom. Chem., Macromol. Symp. 61, 284–296, (1992).

What is claimed is:

1. A process for the modification of a linear or branched $C_3$–$C_{10}$ α-olefin (co)polymer which may contain up to 5% by weight of ethylene, which comprises contacting the (co)polymer, at a temperature of at least 120° C., with an effective amount of at least one peroxide represented by any one of the formulas I–IV to modify the (co)polymer and that the weight average molecular weight of the (co)polymer after modification is at least 70% of the weight average molecular weight of the (co)polymer prior to modification:

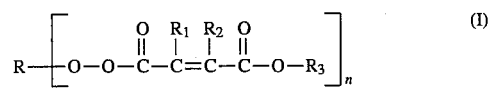

wherein n= 1, 2 or 3; $R^1$ and $R^2$ are independently selected from hydrogen, $C_{1-10}$ alkyl groups, $C_{6-12}$ aryl groups, $C_{7-22}$ aralkyl groups and $C_{7-22}$ alkaryl groups, which groups may be substituted with one or more functional groups selected from hydroxy, halogen, ester, acid, amido, alkoxy, aryloxy, ketone and nitrile groups; $R^3$ is selected from $C_{1-10}$ alkyl groups, $C_{6-12}$ aryl aralkyl groups, $C_{7-22}$ alkaryl groups and $C_{2-10}$ 1-alkene groups, which groups may be substituted with one or more functional groups selected rom hydroxy, halogen, ester, acid, amido, alkoxy, aryloxy, ketone and nitrile groups, and $R^1$ and $R^2$, $R^1$ and $R^3$ or $R^2$ and $R^3$ may combine to form a ring, and when n=1; R is selected from a tertiary-alkyl group, a tertiary cycloalkyl group, a tertiary alkylcycloalkyl group, a tertiary alkynyl group containing 4–8 carbon atoms and a group of the general formula:

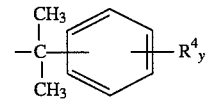

wherein y=0, 1 or 2 and $R^4$ represents an isopropyl group, an isopropenyl group or a 2-hydroxyisopropyl group;

when n= 2; R is selected from an alkylene group with 8–12 carbon atoms which at both ends has a tertiary structure, an alkynylene group with 8–12 carbon atoms which at both ends has a tertiary structure, a group of the general formula:

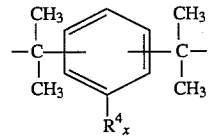

wherein x= 0 or 1 and $R^4$ has the above-indicated meaning; and when n= 3; R= 1,2,4-triisopropylbenzene-α,α',α''-triyl or 1,3,5-triisopropylbenzene-α,α',α''-triyl;

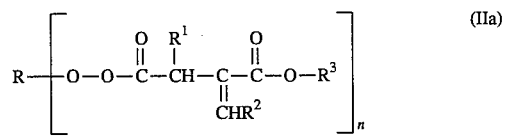

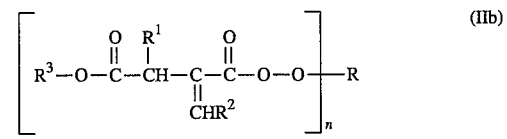

wherein n, $R^1$, $R^2$ and $R^3$ are as defined above;

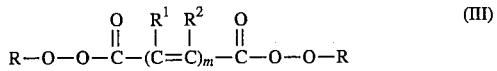

wherein m=1–2 and R, $R^1$ and $R^2$ are as defined above; and

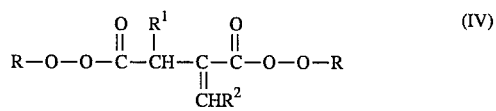

(IV)

wherein R, $R^1$ and $R^2$ are as defined above; and when there is an aromatic ring in the molecule, in the case of disubstitution, the ring substituents must not be ortho to one another and in the case of trisubstitution, the ring substituents must not be in three adjacent positions.

2. The process of claim 1 wherein said peroxide is tertiary-butylperoxy-n-butyl fumarate.

3. The process of claim 1 wherein said process is carried out in the presence of an effective amount of at least one coagent to influence the molecular weight of the modified polypropylene (co)polymer.

4. The process of claim 1 wherein said process is carried out under a substantially oxygen-free atmosphere.

5. The process of claim 1 wherein said process is carried out in melted α-olefin in an oxygen-containing atmosphere.

6. The process claim 1 wherein said modification is carried out at a temperature of 120°–240° C.

7. The process of claim 1 wherein the unmodified α-olefin additionally contains one or more fillers.

8. The process of claim 7 wherein said filler is selected from talc and calcium carbonate.

* * * * *